United States Patent
Braun et al.

(10) Patent No.: US 9,834,176 B2
(45) Date of Patent: Dec. 5, 2017

(54) WIPER SYSTEM FOR MOTOR VEHICLE WINDOWS, MORE PARTICULARLY MOTOR VEHICLE WINDSCREENS

(71) Applicant: Robert Bosch GmbH, Stuttgart (DE)

(72) Inventors: Peter Braun, Buehlertal (DE); Norbert Wegner, Buehl (DE); Florian Tisch, Renchen-Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 24 days.

(21) Appl. No.: 14/901,178

(22) PCT Filed: May 8, 2014

(86) PCT No.: PCT/EP2014/059439
§ 371 (c)(1),
(2) Date: Dec. 28, 2015

(87) PCT Pub. No.: WO2014/206619
PCT Pub. Date: Dec. 31, 2014

(65) Prior Publication Data
US 2016/0129884 A1    May 12, 2016

(30) Foreign Application Priority Data
Jun. 26, 2013 (DE) .......... 10 2013 212 313

(51) Int. Cl.
*B08B 7/00* (2006.01)
*B60S 1/08* (2006.01)

(52) U.S. Cl.
CPC ...................... *B60S 1/08* (2013.01)

(58) Field of Classification Search
None
See application file for complete search history.

(56) References Cited

U.S. PATENT DOCUMENTS

2011/0221372 A1    9/2011  Teder

FOREIGN PATENT DOCUMENTS

| EP | 0850811 | 7/1998 |
|---|---|---|
| GB | 1295185 | 11/1972 |
| JP | S5765990 | 4/1982 |
| JP | 6311264 | 1/1988 |
| JP | 0367754 | 3/1991 |
| JP | H042718 | 1/1992 |
| JP | 2011143862 | 7/2011 |

OTHER PUBLICATIONS

International Search Report for Application No. PCT/EP2014/059439 dated Jun. 13, 2014 (English Translation, 3 pages).

*Primary Examiner* — Eric Golightly
(74) *Attorney, Agent, or Firm* — Michael Best & Friedrich LLP

(57) ABSTRACT

Described is a wiper system for motor vehicle windows, more particularly motor vehicle windscreens, comprising at least one wiper (1, 2), at least one motor (5, 6) that drives the at least one wiper (1, 2), and a switching device (10) for directly controlling the motor (5, 6), wherein the switching device (10) has one or two switching elements (11, 15, 18, 19, 20) by means of which at least four switching states can be selected, and wherein selecting one of the switching states causes an operating mode of the at least one wiper (1, 2) to change.

10 Claims, 3 Drawing Sheets

WIPER SYSTEM FOR MOTOR VEHICLE WINDOWS, MORE PARTICULARLY MOTOR VEHICLE WINDSCREENS

BACKGROUND OF THE INVENTION

Embodiments of the invention relate to a wiper system for motor vehicle windows, more particularly motor vehicle windscreens, and a method for operating a wiper system for motor vehicle windows. In particular, the invention in this case refers to a control of the wiper drive and/or the wiper system.

The windscreen of a motor vehicle is generally cleaned by the use of a wiper system. A wiper system comprises in this case at least one window wiper which has a wiper arm, a wiper motor, a wiper linkage and optionally a wiper gear mechanism, and a switching device, for example in the form of a steering column arm. By means of the steering column arm the driver of the motor vehicle is able to select different operating modes of the window wiper. In particular, continuous operation at fixed wiping frequencies, single wiping mode which performs a single wiping operation when the steering column arm is actuated once, and an intermittent function which performs a wiping cycle with a specific wiping cycle duration and with specific pause times between two wiping cycles, may be selected.

Generally, two different methods are used for controlling a window wiper. The first method uses a steering column arm with a push-button function. In this case, control signals for the window wiper are produced via a central control unit according to the pulse emitted by the push-button and transmitted to the wiper motor with integrated electronics.

The second method uses a steering column arm with a complex switching function. In this case, the steering column arm comprises a plurality of mechanical switches, wherein the different operating modes such as continuous operation, intermittent operation and operation of a rear window wiper may be selected by the positions and/or switching states of the mechanical switches. The individual positions and/or switching states are in this case detected, for example, by a central control unit and transmitted to the wiper motor with integrated electronics.

The aforementioned control methods for a window wiper require a complex steering column mechanism and/or the use of a central control unit which, in particular, requires a complex on-board network architecture.

It is desirable, therefore, to eliminate a complex steering column mechanism and to simplify an on-board network architecture.

SUMMARY OF THE INVENTION

The object of the invention is to solve the aforementioned objects at least partially, for example for the purpose of eliminating a complex steering column mechanism and simplifying an on-board network architecture, whilst maintaining the full functionality of the wiper system, for example a front wiper system.

According to embodiments of the invention, to this end a wiper system for motor vehicle windows, more particularly motor vehicle windscreens, is disclosed, comprising: at least one wiper, at least one motor, which drives the at least one wiper, and a switching device for directly controlling the motor, wherein the switching device has one or two switching elements, at least four switching states being able to be selected thereby, wherein an operating mode of the at least one wiper is changed by selecting one respective switching state.

According to one embodiment, a method is disclosed for operating a wiper system for motor vehicle windows, more particularly motor vehicle windscreens. The wiper system comprises at least one wiper, at least one motor, which drives the at least one wiper, and a switching device for directly controlling the motor, wherein the switching device has one or two switching elements, at least four switching states being able to be selected thereby. The method comprises: actuating the switching device for selecting one of the at least four switching states and changing an operating mode of the at least one wiper based on the selected switching state.

Preferred embodiments and particular features of the invention are disclosed in the subclaims, the drawings and the accompanying description.

By means of the embodiments described here according to the present invention, a complex steering column mechanism may be avoided and an on-board network architecture simplified. This results, in particular, in a reduction in the costs of the system.

According to embodiments of the invention, to this end a wiper system for motor vehicle windows, more particularly motor vehicle windscreens, is disclosed, comprising: at least one wiper, at least one motor, which drives the at least one wiper; and a switching device for directly controlling the motor, wherein the switching device has one or two switching elements, for example mechanical or touch-sensitive push-buttons or push-button switches, at least four switching states being able to be selected thereby, wherein an operating mode of the at least one wiper is changed by selecting one respective switching state. As a result, a complex steering column mechanism may be eliminated and an on-board network architecture simplified. Additionally, in particular, the functionality including safety-relevant functions may be maintained.

According to further typical preferred embodiments of the wiper system, the switching device has the one switching element, wherein the at least four switching states are defined by one respective pulse sequence of an actuation of the switching element. A pulse sequence in this case may consist of a single pulse or a number of pulses. The number of pulses of a pulse sequence corresponds to the number of actuations of the switching element. This permits the implementation of a plurality of selectable operating modes using just one switching element, for example a push-button, a push-button switch, rocker switch or relay. Moreover, such a high degree of flexibility may be achieved as the switching states and/or pulse sequences, for example, may be set to be specific to the vehicle, without mechanical alterations being necessary, for example to the steering column arm.

According to further typical preferred embodiments, the pulse sequences in this case are defined within one respective time interval. For example, the time interval for a first pulse sequence of a first switching state, which is defined by a single actuation, for example may be fixed at 500 ms, so that a second actuation after a time lapse of 500 ms after a first actuation is interpreted as a further first pulse sequence of the first switching state and not, combined with the first actuation, as a second pulse sequence of a second switching state. This minimizes the occurrence of faulty operations and thus increases the reliability of the wiper system. In particular, faulty operation may be avoided when an operating mode is changed rapidly in succession by the user.

According to further typical preferred embodiments of the wiper system, the switching device comprises the two switching elements with two respective possible switching states, wherein the possible combinations of the respective two switching states of the two switching elements correspond to the four switching states. For example, two mechanical switching elements may be provided, whereby a simple steering column mechanism is achieved and only minimal electronics have to be provided.

According to further typical preferred embodiments of the wiper system, in this case at least one further switching state is defined by actuating at least one of the two switching elements with a corresponding pulse sequence, the functionality thereof being described above and being able to be used here. This permits the implementation of a plurality of further selectable operating modes, for example, specific functions such as cleaning, single wiping or actuating the rear window wiper.

According to further typical preferred embodiments of the wiper system, the corresponding pulse sequence is defined within a corresponding time interval. This minimizes the occurrence of faulty operations and thus increases the reliability of the wiper system. In particular, faulty operation may be avoided when an operating mode is changed rapidly in succession by the user.

According to further typical preferred embodiments of the wiper system, at least one of the at least four switching states is defined by an actuation time of the one or at least one of the two switching elements. As a result, a further degree of freedom is provided by which further switching states may be set and/or operating states may be selected by a single switching element.

According to embodiments of the invention, a method for operating a wiper system for motor vehicle windows, more particularly motor vehicle windscreens, is described. The wiper system comprises at least one wiper, at least one motor which drives the at least one wiper, and a switching device for directly controlling the motor, wherein the switching device has one or two switching elements, at least four switching states being able to be selected thereby. The method comprises: actuating the switching device for selecting one of the at least four switching states and changing an operating mode of the at least one wiper based on the selected switching state. As a result, a complex steering column mechanism may be eliminated and an on-board network architecture simplified. Additionally, in particular the functionality including safety-relevant functions may be maintained.

According to further typical preferred embodiments of the method, changing the operating mode of the at least one wiper based on the selected switching state comprises at least one of the following: single wiping, continuous operation of the wiper, intermittent operation of the wiper, operation of the rear window wiper, performing a cleaning function of the front window, performing a cleaning function of the rear window, performing a cleaning function of the headlights, and terminating the wiping operation (switching off). The operating modes are not limited to the above and may comprise all functions which are present in wiper systems. Thus a plurality of operating modes may be selected by the provision of just one and/or two switching elements.

According to further typical preferred embodiments of the method, changing the operating mode, in particular the continuous operation and intermittent operation, comprises increasing or reducing the wiping frequency. For example, the wiping frequency may be increased by a first pulse sequence and the wiping frequency may be reduced by the second pulse sequence. This permits a simple and user-friendly operation.

BRIEF DESCRIPTION OF THE DRAWINGS

Exemplary embodiments of the invention are shown in the drawings and are described in more detail hereinafter. In the drawings.

DETAILED DESCRIPTION

Figure 1:
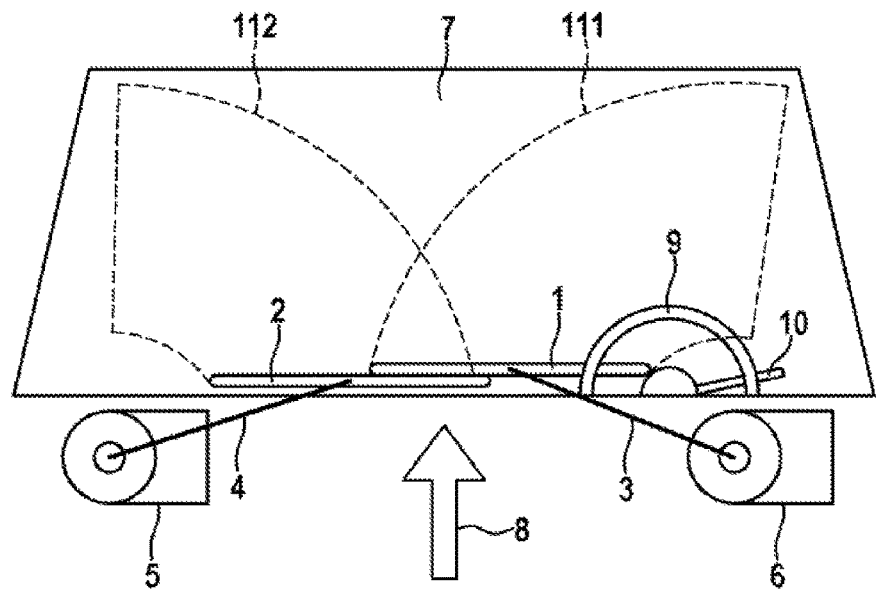
FIG. 1 shows a schematic view of a wiper system according to embodiments described here.

In FIG. 1 a preferred embodiment of a window wiper unit and/or a wiper system with two opposing wipers is shown schematically. The embodiment also serves for illustrating further embodiments, modifications and designs. The wiper unit has a wiper 1 on the driver's side (FS) and a wiper 2 on the passenger side (BS). This is indicated by the steering wheel 9. The first wiper 1 is an upper wiper. It has an upper wiper arm 3 and an upper wiper blade 1. The second wiper 2 is a lower wiper and has a lower wiper arm 4 and a lower wiper blade 2. The first wiper and the second wiper are shown in FIG. 1 in the parked position. In the parked position shown, the wiper blades 1 and 2 are arranged on top of one another, i.e. at least partially overlapping, in the lower region of the window to be wiped. In the first half of a wiping cycle—when wiping upward—the upper wiper blade 1 moves approximately in a quarter circle 111, whilst the opposing lower wiper blade 2 at the same time performs a quarter circle movement 112 in the opposing direction (apart from possible chronological phase displacements of the two wipers). If the wiper blades 1 and 2 have reached their upper reverse positions, they change their direction of movement and after wiping downward they reach their lower reverse positions at the end of the wiping cycle. The lower reverse positions may deviate from the parked position shown in FIG. 1. Moreover, in modern wiper units a so-called extended parked position and/or further function and service positions may be additionally provided.

According to embodiments of the present invention, the wiper system is designed as a two-motor wiper unit. The two wipers in this case are each driven by one motor 5 and/or 6.

The two motors 5 and 6 are controlled by a switching device 10 which is located in the cockpit and is directly connected to the motors 5 and 6 (for example by a cable harness). The motors 5 and 6 may in this case be connected in series or in parallel to the switching device 10. Moreover, one motor may act as a master for the second motor. Furthermore, the motors 5 and 6 have an electronics unit suitable for carrying out the control.

According to embodiments of the present invention which may be combined with other embodiments, the switching device is adapted in order to control the motor(s) directly. The switching device is directly connected to the motor or to at least one of the motors, for example via an electrical lead such as a cable or a cable harness. The connection and/or communication of the switching device relative to the motor does not therefore necessarily take place via a central control unit.

The switching device 10 may be present on the steering column, for example as a steering column arm, as shown in FIG. 1. The switching device 10, however, may be configured as any other suitable device and may be located at any other suitable point in the cockpit. For example, the switching device 10 may comprise mechanical or touch-sensitive push-buttons or push-button switches, toggle switches, rocker switches or relays. According to some embodiments of the present invention, the switching device 10 is present on the steering wheel 9.

It goes without saying that the present invention is not limited to wiper systems with two opposing wipers. Alternatively, the present invention may also be used in wiper systems with only one wiper or with two opposing wipers, for example.

FIGS. 2 to 6 show different embodiments of the switching device 10.

Figure 2:
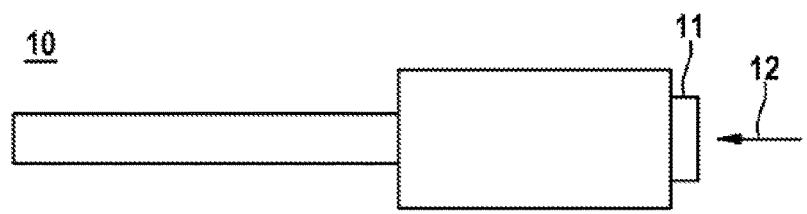
FIG. 2 shows a schematic view of a switching device, in particular of a steering column arm, according to embodiments described here.

FIG. 2 shows an exemplary embodiment of the present invention in which a switching element 11 is present on the steering column arm. Although the switching element 11 is arranged to the side in FIG. 2, it goes without saying that it may be arranged on any side or corner of the steering column arm, for example on its upper face, lower face, rear face or front face.

The at least four switching states are defined by one respective pulse sequence of an actuation of the switching element 11. A pulse sequence in this case may consist of a single pulse or a number of pulses. The number of pulses of a pulse sequence corresponds to the number of actuations of the switching element. The switching element 11 may, for example, be a push-button, a push-button switch or rocker switch. The actuation may be carried out, for example, by pressing or touching the switching element 11 as indicated in FIG. 2 by the arrow 12. This permits the implementation of a plurality of selectable operating modes by the single switching element 11. The pulses may be read, for example, in the form of binary signals and transmitted to the motors 5 and 6.

For example, a number of pulse sequences may be set, said pulse sequences defining the modes for changing the operating modes. If the wiper is switched off, a single actuation (pulse sequence with a single pulse), for example, may initiate an intermittent operation of the wiper at the lowest frequency. A further single actuation may then, for example, increase a wiping frequency by a predetermined interval, etc. In particular, by repeated single actuation, for example, the operating modes may be switched from a lowest wiping stage (for example intermittent operation at lowest frequency) to a highest wiping stage (for example continuous operation at maximum frequency). A second actuation may, for example, in turn increase a wiping frequency. In particular, for example by actuating twice, the operating modes may be switched from a currently selected wiping stage (for example continuous operation at maximum frequency) to a desired wiping stage (for example intermittent operation at lowest frequency).

To this end, it is advantageous if the pulse sequences in this case are defined within one respective time interval. For example, the time interval for a first pulse sequence of a first switching state which is defined by a single actuation, for example, may be set at 500 ms, so that a second actuation after the time lapse of 500 ms after a first actuation is interpreted as a further first pulse sequence of the first switching state and not, together with the first actuation, as the second pulse sequence of a second switching state. This minimizes the occurrence of faulty operations and increases the reliability of the wiper system. In particular, faulty operation may be avoided when an operating mode is changed rapidly in succession by the user.

According to further typical preferred embodiments of the wiper system, at least one of the at least four switching states is defined by an actuation time of the switching element 11. In this case, for example, the operating modes may be switched and/or changed continuously (for example increasing or reducing a wiping frequency) as long as an uninterrupted actuation of the switching element 11 takes place.

Figure 3:
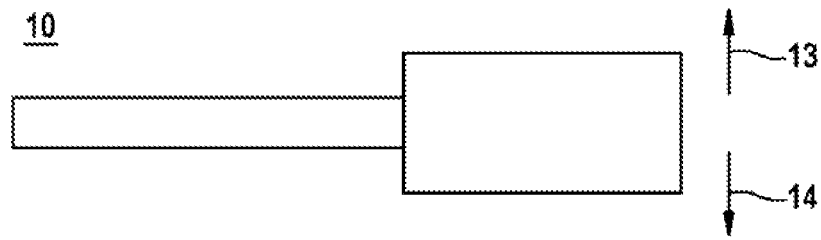
FIG. 3 shows a schematic view of a switching device, in particular of a steering column arm, according to embodiments described here.

FIG. 3 shows an exemplary embodiment of the present invention in which a switching element (not shown), for example a relay, is actuated by a movement of the steering column arm 10. The steering column arm 10 in this case may be actuated in at least one of the directions 13 and 14. The functionalities may be the same as those of the switching element 11 which is explained above with reference to FIG. 2 and may be used, in particular, in the embodiment of FIG. 3. In particular, the movement in the direction 13 and/or 14 may be processed as a push-button signal. The steering column arm moves back into its initial position, therefore, after a push-button movement which is manually maintained over a specific time period.

Furthermore, the provision of two actuating directions 13 and 14 may permit operating modes or functionalities to be grouped together. For example, an actuation, i.e. a pulse emitted, in the direction 13 may change the operating modes of the front window wiper and an actuation in the direction 14 may change the operating modes of the rear window wiper.

Figure 4:
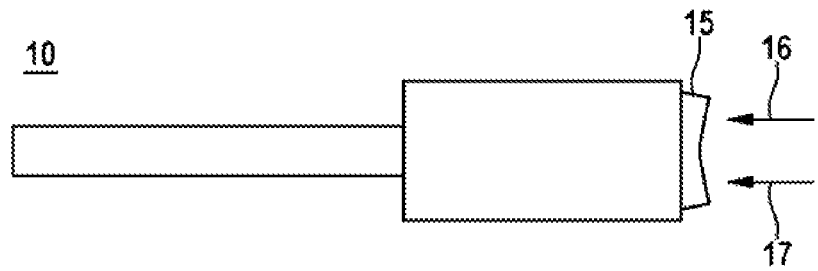
FIG. 4 shows a schematic view of a switching device, in particular of a steering column arm, according to embodiments described here.

FIG. 4 shows an exemplary embodiment of the present invention in which a switching element 15 is present on the steering column arm. Although the switching element 15 in FIG. 4 is arranged to the side, it goes without saying that it may be arranged on any side or corner of the steering column arm, for example on its upper face, lower face, rear face or front face.

The switching element 15 may in this case be actuated on at least two points 16 and 17. In particular, the switching element 15 may be configured as a rocker switch. The functionalities may be the same as those of the steering column arm which is described above with reference to FIG. 3, and in particular may be used in the embodiment of FIG. 3. In particular, the functionalities of the directions 13 and 14 of FIG. 3 may correspond to the functionalities of the actuating points 16 and/or 17.

Figure 5A:
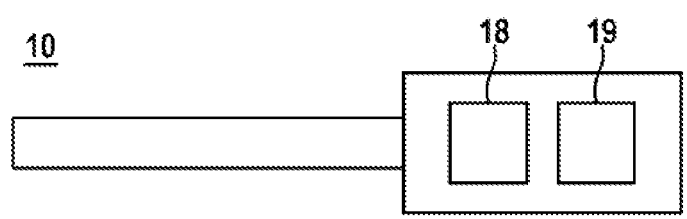
FIG. 5a shows a schematic view of a switching device, in particular of a steering column arm, according to embodiments described here.
Figure 5B:
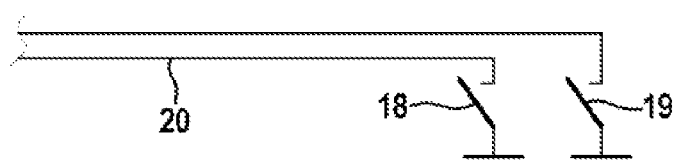
FIG. 5b shows a circuit diagram of the switching device of FIG. 5a according to embodiments described here.

FIG. 5a shows an exemplary embodiment of the present invention in which two switching elements 18 and 19 are present on the switching device 10. In FIG. 5 this is shown in turn on the example of the steering column arm. FIG. 5b shows a circuit diagram of the switching elements 18 and 19 of FIG. 5a. The two switching elements 18 and 19 in this case are connected, for example, by a cable harness 20 directly to the motors.

Each of the two switching elements 18 and 19 has two possible switching states 1 and 2. The possible combinations of the two respective switching states 1 and 2 of the two switching elements 18 and 19 correspond to four switching states S1-S4, one respective operating mode and/or one change of an operating mode being assigned thereto. This is shown by way of example in the following table.

| Switching state | Switching state of first switching element | Switching state of second switching element | Example 1 | Example 2 |
|---|---|---|---|---|
| S1 | 0 | 0 | Wiper off | Wiper off |
| S2 | 1 | 0 | Intermittent operation | Increase wiping frequency |
| S3 | 1 | 1 | Continuous operation | Reduce wiping frequency |
| S4 | 0 | 1 | Cleaning | Cleaning |

According to further typical preferred embodiments of the wiper system, in this case at least one further switching state is defined by an actuation of at least one of the two switching elements with a corresponding pulse sequence. The design and the functionality of the switching device with the pulse sequence are the same as those described with reference to FIGS. 2 to 4 and they may be used, in particular, in the embodiment of FIG. 5.

According to further typical preferred embodiments of the wiper system, the corresponding pulse sequence is defined within a corresponding time interval. The design and the functionality are the same as those described with reference to FIGS. 2 to 4, and they are able to be used, in particular, in the embodiment of FIG. 5.

Figure 6:
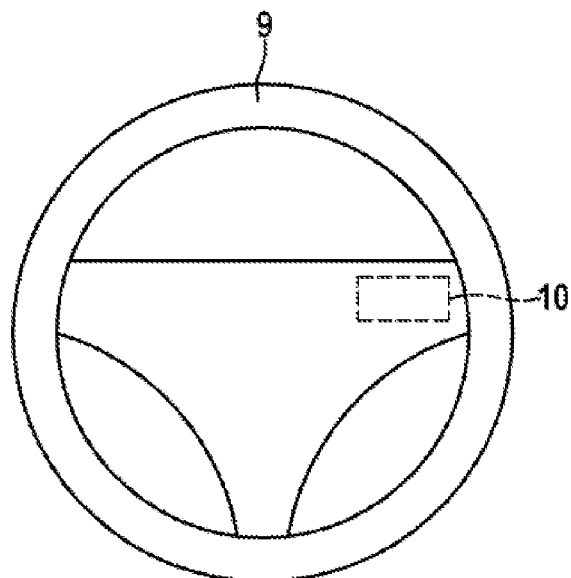
FIG. 6 shows a schematic view of a switching device which is provided on a steering wheel, according to embodiments described here.

FIG. 6 shows an exemplary embodiment of the present invention in which the switching device 10 is arranged on the steering wheel 9. This embodiment differs from the embodiments of FIGS. 2, 4 and 5 only in the arrangement of the switching device. The design and the functionality of the switching device 10 arranged on the steering wheel 9 with one or two switching elements are the same as those described with reference to FIGS. 2, 4 and 5 and they are able to be used in particular in the embodiment of FIG. 6.

Figure 7:
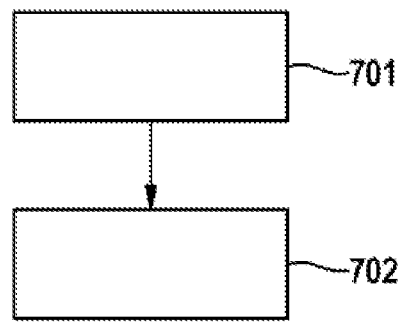
FIG. 7 shows a flow diagram for a method for operating a wiper system according to embodiments described here.

FIG. 7 shows a flow diagram for a method according to embodiments of the present invention. In step 701, the switching device is actuated for selecting one of the at least four switching states. In step 702, an operating mode of the at least one wiper is changed on the basis of the selected switching state.

Changing the operating mode of the at least one wiper based on the selected switching state comprises at least one of the following: single wiping, continuous operation of the wiper, intermittent operation of the wiper, increasing or reducing the wiping frequency, operating a rear window wiper, performing a cleaning function of the front window, performing a cleaning function of the rear window, performing a cleaning function of the headlights, and terminating the wiping operation.

The invention claimed is:

1. A wiper system for motor vehicle windows, comprising:
    at least one wiper (1, 2);
    at least one motor (5, 6) which drives the at least one wiper (1, 2); and
    a switching device (10) for directly controlling the at least one motor (5, 6), wherein the switching device (10) has one or two switching elements (11, 15, 18, 19, 20) for selecting at least four switching states, wherein the switching device is configured such that an operating mode of the at least one wiper (1, 2) is changed by selecting one respective switching state,
    wherein the switching device (10) has one switching element (11, 15), and wherein the at least four switching states are defined by one respective pulse sequence of an actuation of the one switching element.

2. The wiper system as claimed in claim 1, wherein pulse sequences are defined within one respective time interval.

3. The wiper system as claimed in claim 1, wherein the switching device (10) comprises two switching elements (18, 19) with two respective possible switching states, and wherein possible combinations of the two respective switching states of the two switching elements (18, 19) correspond to the four switching states.

4. The wiper system as claimed in claim 3, wherein at least one further switching state is defined by actuating at least one of the two switching elements (18, 19) with a corresponding pulse sequence.

5. The wiper system as claimed in claim 4, wherein the corresponding pulse sequence is defined within a corresponding time interval.

6. The wiper system as claimed in claim 1, wherein at least one of the at least four switching states is defined by an actuation period of the one or at least one of the two switching elements (11, 15, 18, 19, 20).

7. A method for operating a wiper system for motor vehicle windows as claimed in claim 1, comprising at least one wiper (1, 2), at least one motor (5, 6) which drives the at least one wiper (1, 2), and a switching device (10) for directly controlling the motor (5, 6), wherein the switching device (10) has one or two switching elements (11, 15, 18, 19, 20), at least four switching states being able to be selected thereby, the method comprising:
    actuating (701) the switching device (10) for selecting one of the at least four switching states; and
    changing (702) an operating mode of the at least one wiper (1, 2) based on the selected switching state.

8. The method as claimed in claim 7, wherein changing (702) the operating mode of the at least one wiper (1, 2) based on the selected switching state comprises at least one of the following: single wiping, continuous operation of the wiper, intermittent operation of the wiper, operation of a rear window wiper, performing a cleaning function of a front window, performing a cleaning function of the rear window, performing a cleaning function of the headlights, and terminating the wiping operation.

9. The method as claimed in claim 8, wherein changing (702) the operating mode comprises increasing or reducing a wiping frequency.

10. The method as claimed in claim 8, wherein changing (702) the operating mode in continuous operation and intermittent operation comprises increasing or reducing a wiping frequency.

* * * * *